(12) United States Patent
Onimaru et al.

(10) Patent No.: US 6,478,716 B2
(45) Date of Patent: Nov. 12, 2002

(54) VEHICLE DECELERATION CONTROLLER

(75) Inventors: Yoshiyuki Onimaru, Nagoya (JP); Toshinori Murahashi, Chiryu (JP); Toshiaki Ishiguro, Chita (JP); Torao Kawaguchi, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 15 days.

(21) Appl. No.: 09/789,498

(22) Filed: Feb. 22, 2001

(65) Prior Publication Data

US 2001/0018384 A1 Aug. 30, 2001

(30) Foreign Application Priority Data

Feb. 24, 2000 (JP) ......................................... 2000-047309

(51) Int. Cl.⁷ ............................................... F16H 61/00
(52) U.S. Cl. ...................... 477/118; 477/94; 477/186; 477/187; 701/70
(58) Field of Search .................... 477/118, 120, 477/94, 187, 186, 900, 904; 701/53, 58, 65, 70, 93, 96; 303/138, 152, 155

(56) References Cited

U.S. PATENT DOCUMENTS 4,393,467 A * 7/1983 Miki et al. ................... 477/65
6,029,107 A * 2/2000 Sato ............................ 477/120
6,033,041 A * 3/2000 Koga et al. .................. 188/159
6,122,585 A * 9/2000 Ono et al. .................... 180/197
6,216,082 B1 * 4/2001 Minowa et al. .............. 701/111
6,249,735 B1 * 6/2001 Yamada et al. ............... 701/65
6,270,172 B1 * 8/2001 Shirai et al. ................. 303/112

FOREIGN PATENT DOCUMENTS

JP 7-127720 5/1995

* cited by examiner

Primary Examiner—Richard M. Lorence
Assistant Examiner—Tisha D. Lewis
(74) Attorney, Agent, or Firm—Burns, Doane, Swecker & Mathis, LLP

(57) ABSTRACT

A vehicle deceleration controller which is able to relatively reliably satisfy the intended deceleration of the driver irrespective of changes in the vehicle speed, the gradient of the driving road surface and the total weight of the vehicle includes a deceleration determining device that determines a required deceleration in accordance with the vehicle speed and the gradient of the driving road surface with reference to stored characteristic information, and an operation mode determining device that determines the required operation mode in accordance with the required deceleration determined by the deceleration determining device and the vehicle speed and the total vehicle weight with reference to stored characteristic information. An outputting device operates a braking force generating device with the required operation mode when it is determined that the accelerator has been released.

14 Claims, 3 Drawing Sheets

VEHICLE DECELERATION CONTROLLER

This application is based on and claims priority under 35 U.S.C. §119 with respect to Japanese Application No. 2000-047309 filed on Feb. 24, 2000, the entire content of which is incorporated herein by reference.

FIELD OF THE INVENTION

This invention generally relates to a control device for controlling vehicle deceleration. More particularly, the present invention pertains to a vehicle deceleration controller that is adapted to provide a deceleration intended by the driver when an accelerator is released during driving.

BACKGROUND OF THE INVENTION

Japanese Patent Laid-Open Publication No. H07-127720 discloses a speed change controller for an automatic vehicle transmission. The speed change controller automatically controls gear shifting by following a predetermined deceleration gear shifting pattern based on the shift position, the vehicle speed, and a value corresponding to the gradient of the road surface when the deceleration of the vehicle is detected (i.e., when the accelerator is released during driving). This brings about a deceleration effect through engine braking.

In this known speed change controller for automatic vehicle transmissions, the deceleration effect produced by engine braking and the required deceleration (i.e., the deceleration intended by the driver) when the accelerator is released do not always agree with each other. Thus, the deceleration obtained by the speed change controller may not satisfy the intent of the driver. Because the total vehicle weight, including the load, is not considered for speed control during deceleration in the aforementioned speed change controller, the optimal deceleration (i.e., the required deceleration) intended by the driver may not always be realized. That is because the deceleration by the engine brake obtained by the speed change controller varies depending on the total vehicle weight which varies depending on the load of the vehicle, particularly in case of a truck.

In light of the foregoing, a need exists for an improved vehicle deceleration controller that is not as susceptible to the shortcomings discussed above.

A need exists for a vehicle deceleration controller which is able to generally always satisfy the required or intended deceleration irrespective of changes in the vehicle speed, the gradient of the driving road, and the total vehicle weight.

SUMMARY OF THE INVENTION

In light of the foregoing, the present invention provides a vehicle deceleration controller that includes an accelerator condition detecting device that detects the vehicle accelerator condition, a vehicle detecting device that detects the vehicle speed, a road surface gradient detecting device that detects the gradient of the driving road, a vehicle weight detecting device that detects the total vehicle weight including the load of the vehicle, a braking force generating device that generates the braking force for braking the vehicle, and a judging device for judging the release of the accelerator based on the detected signal of the accelerator condition detecting device. A required deceleration memory device memorizes the required deceleration varying in accordance with the vehicle speed and the gradient of the driving road surface as a function of the vehicle speed and the gradient of the driving road surface, and a deceleration determining device determines the required deceleration in accordance with the driving road surface and the vehicle speed detected by the vehicle speed detecting device and the road surface gradient detecting device respectively while also referring to the memory of the required deceleration memory device. An operation mode memory device then memorizes the vehicle deceleration varying in accordance with the total vehicle weight, the vehicle speed, and an operation mode of the braking force generating device as a function of the operation mode, the vehicle speed, and the total vehicle weight, while an operation mode determining device determines the required operation mode in accordance with the required deceleration determined by the deceleration determining device and the vehicle speed and the total vehicle weight detected by the vehicle speed detecting device and the vehicle weight detecting device respectively while also referring to the memory of the operation mode memory device. An outputting mechanism then operates the braking force generating device with the required operation mode when the release of the accelerator is judged by the judging device. In this case, the braking force generating device includes an automatic transmission and an exhaust brake system.

In accordance with the vehicle deceleration controller of the present invention, when the accelerator is released during driving, the release of the accelerator is judged by the judging device based on the detected signal of the accelerator condition detecting device. Upon such judgment, the braking force generating device is operated with the required operation mode by the outputting mechanism.

The aforementioned required operation mode is determined in accordance with the required deceleration as well as the total vehicle weight and the vehicle speed detected by the vehicle weight detecting device and the vehicle speed detecting device respectively while also referring to the memory of the operation mode memory device memorized as a function of the vehicle speed and the total vehicle weight. The aforementioned required deceleration is determined in accordance with the vehicle speed and the gradient of the driving road surface detected by the vehicle speed detecting device and the road surface gradient detecting device respectively, while also referring to the memory of the required deceleration memory device memorizing the required deceleration that varies in accordance with a function of the vehicle speed and the gradient of the driving road surface.

Thus, with the vehicle deceleration controller of the present invention, when the accelerator is released during vehicle driving, the required deceleration in accordance with the vehicle speed and the gradient of the driving road surface can be obtained based on the magnitude of the total vehicle weight by the operation of the braking force generating device with the required operation mode. As a result, the vehicle deceleration obtained by the braking force generating device and the deceleration intended by the driver always agree with each other, thus satisfying the driver's intent with respect to deceleration, even in the event of variations or changes in the vehicle speed, the gradient of the driving road surface and the total vehicle weight.

The vehicle deceleration controller of the present invention is also advantageous in that conventional devices such as the automatic transmission and the exhaust brake system can be adopted as the braking force generating device. Thus, implementation of the present invention does not entail a significant increase in manufacturing cost.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
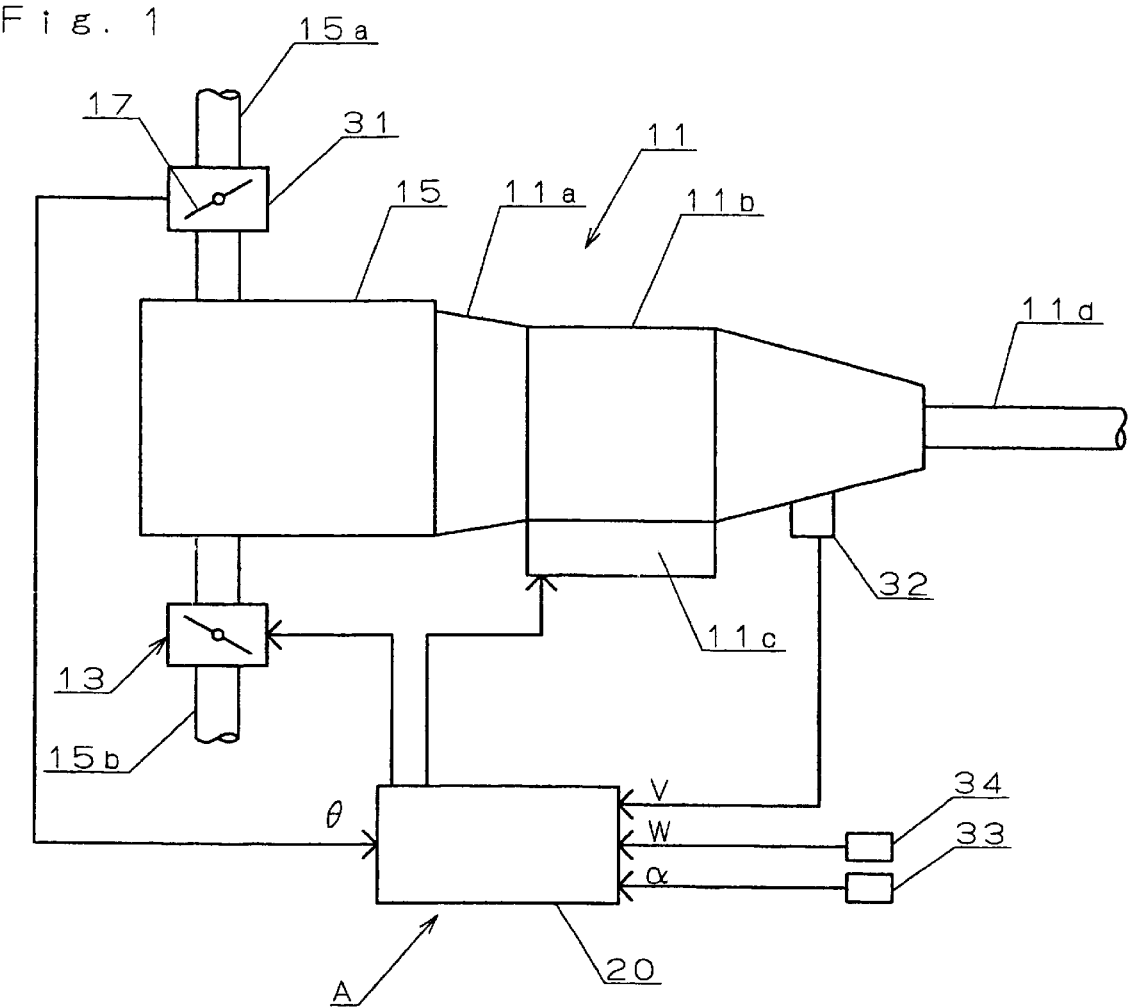
FIG. 1 is a schematic illustration of a vehicle deceleration controller in accordance with the present invention adapted for use in a vehicle provided with an automatic transmission and an exhaust brake system.

Referring initially to FIG. 1, the vehicle deceleration controller A of the present invention is adapted to be provided in a vehicle and includes an automatic transmission 11 and an exhaust brake system 13. The automatic transmission 11 is connected to the output shaft of an engine (internal combustion engine) 15 for effecting torque transmission. The automatic transmission 11 includes a torque converter 11a with a lock-up clutch for inputting the generated torque of the internal combustion engine 15 via a multi-shift speed change gear drive mechanism 11b to output the torque with various gear ratios in accordance with the output from the torque converter 11a. The automatic transmission 11 also includes a hydraulic pressure control mechanism 11c controlling the operation mode of the gear drive mechanism 11b and the torque converter 11a.

The hydraulic pressure control mechanism 11c includes a plurality of solenoid valves (not shown) that are adapted to be opened and closed under the control of an electric controller 20. The hydraulic pressure control mechanism 11c operates to switch ON and OFF the lock-up clutch provided in the torque converter 11a and to change the shift to an intended shift position by switching the combination of the plurality of solenoid valves which switch ON and OFF the clutches and brakes of the speed change gear drive mechanism 11b.

The exhaust brake system 13 is provided on an exhaust pipe 15b of the internal combustion engine 15 and is ON-OFF controlled by the electric controller 20. An expected engine brake effect (i.e., the generation of braking force) is obtained by cooperation of the automatic transmission 11 and the exhaust brake system 13. A throttle valve 17 operatively connected to an accelerator pedal (not shown) is positioned in an intake pipe 15a of the internal combustion engine 15.

The vehicle deceleration controller A includes an accelerator condition detecting sensor (accelerator sensor) 31 that detects the accelerator condition of the vehicle based on the opening degree θ of the throttle valve 17. The vehicle deceleration controller A also includes a vehicle speed detecting sensor (speed sensor) 32 that detects the speed V of the vehicle based on the rotation of the output shaft 11d of the automatic transmission 11, a road gradient detecting sensor 33 that directly detects the gradient α of the driving road surface, a vehicle weight detecting sensor 34 that directly detects the total vehicle weight W including the load in the vehicle, the exhaust brake system 13 that generates an engine brake for decelerating the vehicle through cooperation with the automatic transmission 11, and the electric controller 20 that controls the operation mode of the automatic transmission 11 and the exhaust brake system 13.

The electric controller 20 includes a microprocessor that receives input information in the form of signals from the accelerator condition detecting sensor 31, the vehicle speed sensor 32, the road gradient detecting sensor 33, and the vehicle weight detecting sensor 34. The electric controller 20 also functions as a judging means, a required deceleration memory mean, a deceleration determining means, an operation mode memory means, an operation mode deciding means, and an output means.

Figure 2:
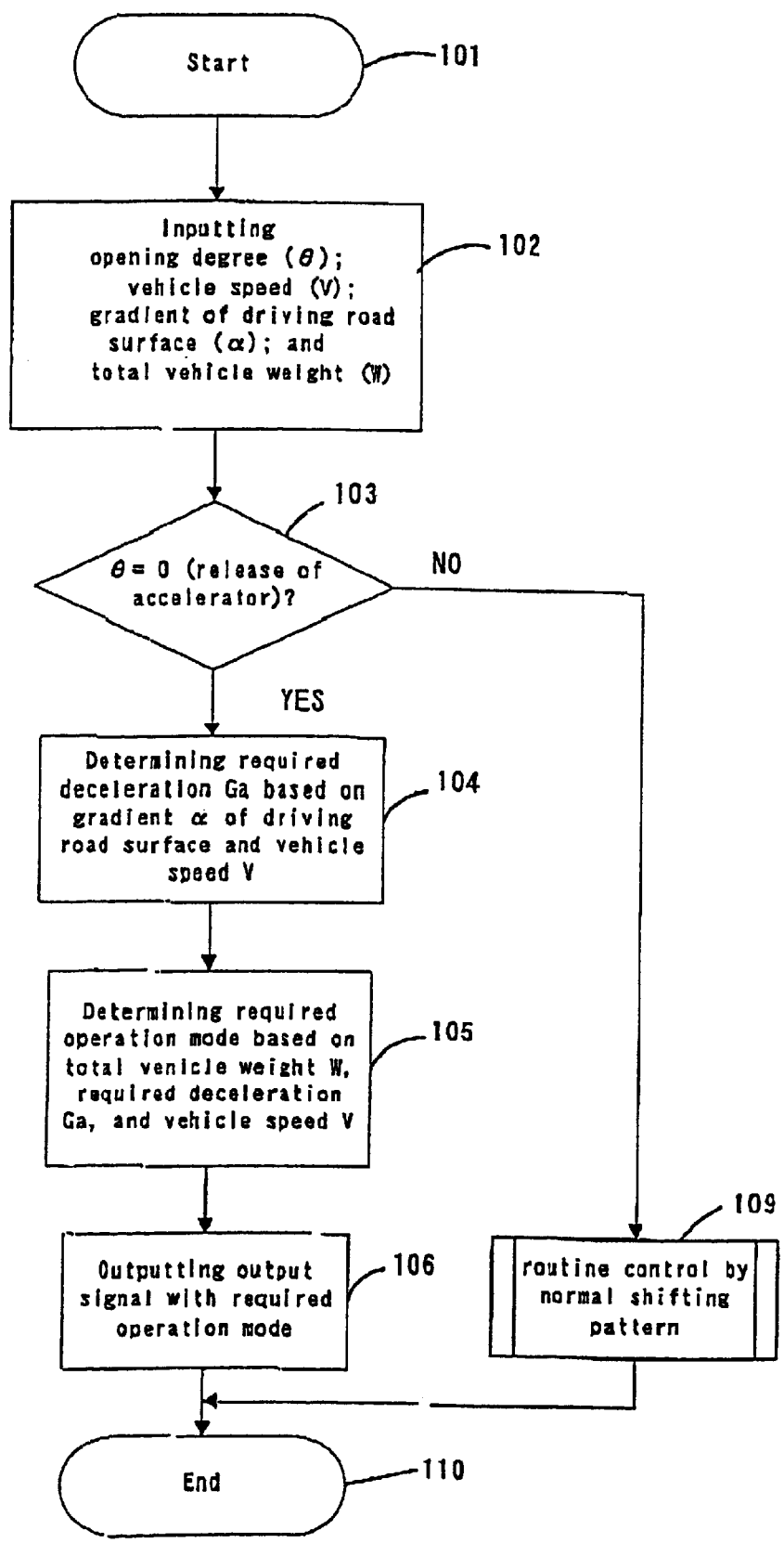
FIG. 2 is a flowchart of the control program carried out in connection with the operation of the present invention shown in FIG. 1.
Figure 3:
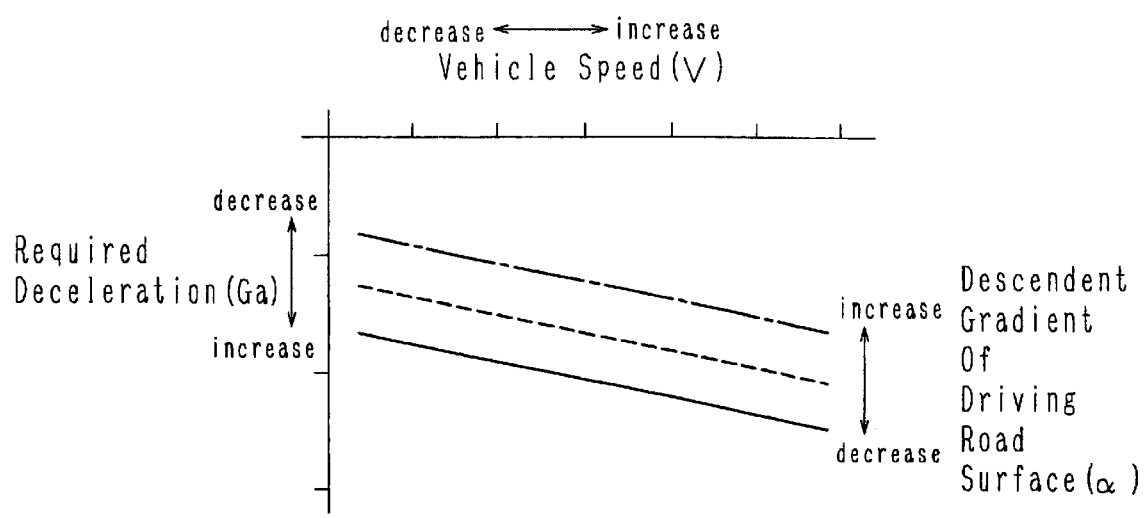
FIG. 3 shows various characteristic lines indicating the relationship between the vehicle speed, the downhill gradient of the driving road, and the required deceleration.
Figure 4:
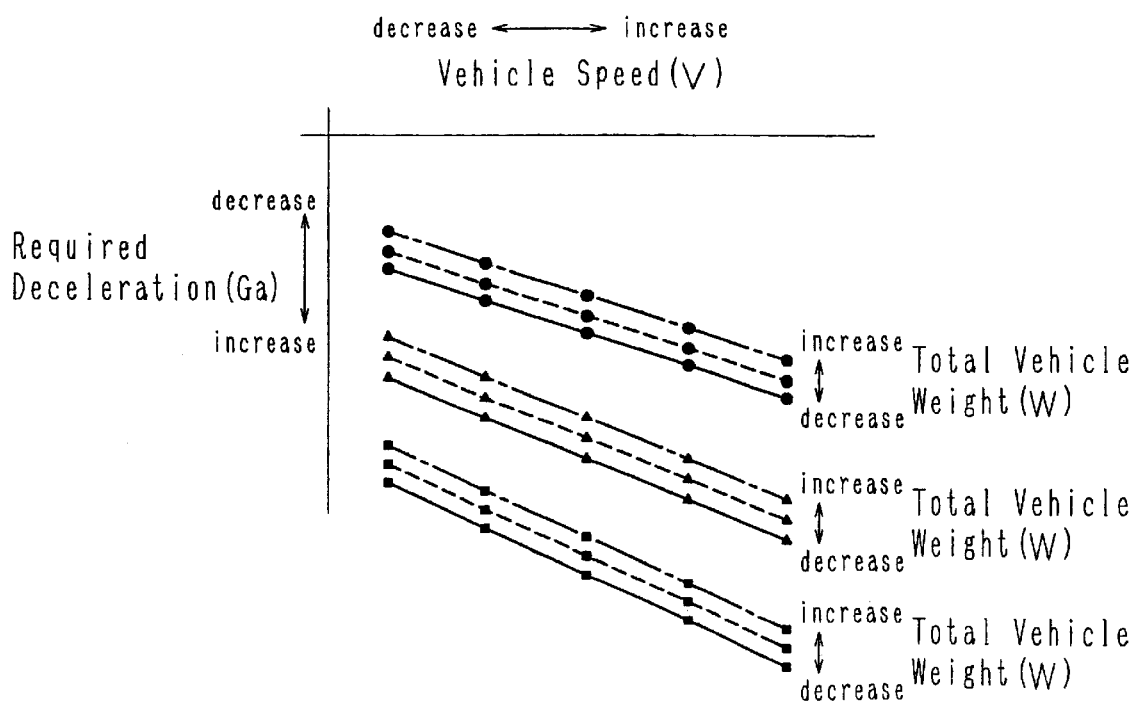
FIG. 4 shows various characteristic lines indicating the relationship between the vehicle speed, the total vehicle weight, the operation mode, and the vehicle deceleration.

The electric controller 20 possesses a memory that stores the control program shown in the flowchart of FIG. 2, the required deceleration Ga indicated by the characteristic lines in FIG. 3 in table form, and the relationships between the vehicle speed V, the total vehicle weight W and the vehicle deceleration G for each operation mode indicated by characteristic lines in FIG. 4. The required deceleration Ga is the deceleration that satisfies the driver's intended or expected deceleration when the driver releases the accelerator pedal while driving.

As used here, the phrase required deceleration refers to the deceleration expected by the driver upon release of the accelerator. Thus, the required deceleration corresponds to the deceleration that the driver expects or that satisfies the drivers desire when the acceleration pedal is released. This required or expected deceleration is generally increased or relatively greater in accordance with increased vehicle speed and is reduced or relatively less in accordance with increased downhill gradient of the driving road surface.

The required deceleration Ga varies in accordance with changes in the gradient α of the driving road and the vehicle speed V. Generally, the required deceleration Ga is predetermined to increase in proportion to an increase in the vehicle speed V and to decrease in proportion to an increase in the downhill gradient α of the driving road. The required deceleration Ga can be also predetermined to increase in proportion to an increase in the uphill gradient α of the driving road.

The characteristic lines in FIG. 3, as well as the characteristic lines associated with each of the modes shown in FIG. 4, are differentiated to indicate a range of gradient α of the driving road surface. Although FIG. 3 illustrates three characteristic lines, it is to be understood that a different number of characteristic lines (e.g., a greater number of characteristic lines) may be provided. Similarly, a different number of characteristic lines may be provided for each of the operating modes illustrated in FIG. 4.

Each operation mode indicated by ■ in FIG. 4 is a mode in which the automatic transmission 11 is shifted to the third speed, the lock-up clutch is ON, and the exhaust brake system 13 is ON. Each operation mode indicated by ▲ in FIG. 4 is a mode in which the automatic transmission 11 is shifted to the fourth speed, the lock-up clutch is ON, and the exhaust brake system 13 is ON. Each mode indicated by ● in FIG. 4 is a mode in which the automatic transmission 11 is shifted to the fifth speed, the lock-up clutch is ON, and the exhaust brake system 13 is ON.

Referring to the flowchart shown in FIG. 2, the operation of the vehicle deceleration controller A of the present invention is as follows. The control program shown in FIG. 2 is started at Step 101 at predetermined short intervals. In Step 102, the opening degree θ, the vehicle speed V, the gradient α of the driving road, and the total vehicle weight W are inputted to the controller 20 from the acceleration sensor 31, the vehicle speed sensor 32, the road gradient sensor 33, and the vehicle weight detecting sensor 34 respectively. This information is then used to judge or determine whether θ=0 (i.e., whether the accelerator has been released) in Step 103.

When the driver depresses the accelerator pedal (i.e., when the accelerator is deemed to be ON) while carrying out Step 103, a determination or judgment of "NO" is made in Step 103 to complete the execution of the program in Step 110 after carrying out the control routine involving the "normal shifting pattern" in Step 109. On the other hand, when the driver releases the acceleration pedal (i.e., when the accelerator is deemed to be OFF) while executing Step 103, a determination or judgment of "YES" is made in Step 103, whereupon Steps 104–106 are executed followed by completion of the program in Step 110.

In Step 104, the required deceleration Ga in accordance with the detected gradient α of the driving road detected by the road gradient sensor 33 and the vehicle speed V detected by the vehicle speed sensor 32 is determined while referring to the information stored in the memory portion of the electric controller 20.

In Step 105, referring to the information stored in the memory portion of the electric controller 20 (i.e., the stored information regarding the required deceleration G varying in accordance with the operation mode of the automatic transmission 11 and the exhaust brake system 13, the vehicle speed V, and the total vehicle weight W memorized in relation to the operation mode, the vehicle speed V and the total vehicle weight W), the required operation mode is determined based on the required deceleration Ga determined in Step 104, the vehicle speed V detected by the vehicle speed sensor 32 and the total vehicle weight W detected by the vehicle weight detecting sensor 34.

In Step 106, an output signal for operating the automatic transmission 11 and the exhaust brake system 13 in the required operation mode determined in Step 105 is then outputted. The shifting pattern of the automatic transmission 11 is thus controlled and the operation and non-operation mode (ON/OFF) of the exhaust brake system 13 is controlled to cause the operation mode of the automatic transmission 11 and the exhaust brake system 13 to agree with the required operation mode determined in Step 105.

Thus, with the present invention, once the accelerator is released, the required or expected deceleration Ga is determined using the characteristic lines shown in FIG. 3 and based on the gradient of the driving road surface and the vehicle speed determined according to the input from the respective detectors. Once the required or expected deceleration Ga is determined, the required operation mode is determined using the characteristic lines in FIG. 4. Using the values for the total vehicle weight and the vehicle speed, in conjunction with the determined required or expected deceleration Ga, the required operation mode ●, ▲, ■ shown in FIG. 4 for achieving the deceleration corresponding to the driver's intended or expected deceleration can be determined. It is to be noted that it is not absolutely necessary to take into account the vehicle speed when determining the required operating mode as the vehicle speed is taken into account in determining the required or expected deceleration.

According to the present invention, when the driver releases the accelerator pedal while driving, the expected engine brake is obtained irrespective of the total vehicle weight W by the operation of the automatic transmission 11 and the exhaust brake system 13 with the required operation mode to obtain the required deceleration Ga (the deceleration intended by the driver) based on the gradient α of the driving road and the vehicle speed V. As a result, the deceleration intended by the driver and the vehicle deceleration obtained by the operation of the automatic transmission 11 and the exhaust brake system 13 always agree with one another, thus satisfying the driver's intent for the deceleration.

Because the automatic transmission 11 and the exhaust brake system 13 (i.e., the conventional devices that are normally used) are used as braking force generation means for obtaining the required deceleration Ga in this embodiment of the present invention, the production cost is reduced.

Although the automatic transmission 11 and the exhaust brake system 13 are used in the described embodiment of the present invention as the braking force generating means for gaining the required or expected deceleration Ga, in case the vehicle has a manual transmission instead of the automatic transmission, other braking force generating means such as a retarder (the braking force generating means may be single or plural) may be adopted to achieve the required deceleration Ga. Both the automatic transmission and the retarder can also be adopted.

Although the total vehicle weight W is directly detected by the vehicle weight detecting sensor 34 in the embodiment of the present invention, the total vehicle weight W can be indirectly detected by calculation using the driving torque and the vehicle acceleration before and after the shift change. In addition, as an alternative to the road surface gradient detecting sensor 33 used to directly determine the gradient α of the driving road, the gradient α of the driving road surface can be indirectly detected through calculation using the vehicle acceleration and the function based on the total vehicle weight W, the driving torque, and the vehicle speed.

Furthermore, although the speed V of the vehicle is detected from the rotation of the output shaft 11d of the automatic transmission 11 by the speed sensor 32 in the described embodiment of the present invention, the speed V of the vehicle can be detected based on the rotation of a vehicle wheel. Furthermore, although the accelerator condition is detected from the opening degree θ of the throttle valve 17 by the accelerator sensor 31 in the described embodiment of the present invention, the accelerator condition can be detected based on the degree of depression of the accelerator pedal.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle deceleration controller comprising:

accelerator condition detecting means for detecting a vehicle accelerator condition;

vehicle speed detecting means for detecting a vehicle speed;

road surface gradient detecting means for detecting a gradient of a driving road surface;

vehicle weight detecting means for detecting a total vehicle weight including a load of the vehicle;

braking force generating means for generating a braking force for braking the vehicle;

judging means for judging release of the vehicle accelerator based on a detected signal of the accelerator condition detecting means;

required deceleration memory means in which is memorized a required deceleration that varies in accordance with the vehicle speed and the gradient of the driving road surface;

required deceleration determining means for determining the required deceleration using the required deceleration memorized in the required deceleration memory means and based on the vehicle speed detected by the vehicle speed detecting means and the gradient of the driving road surface detected by the road surface gradient detecting means;

operation mode memory means in which is memorized an operation mode that varies in accordance with the vehicle deceleration, the vehicle speed and the total vehicle weight;

operation mode determining means for determining a required operation mode referring to the operation mode memorized in the operation mode memory means and based on the required deceleration determined by the deceleration determining means, the vehicle speed detected by the vehicle speed detecting means and the total vehicle weight detected by the vehicle weight detecting means; and outputting means for operating the braking force generating means with the required operation mode when the release of the accelerator is judged by the judging means.

2. The vehicle deceleration controller according to claim 1, wherein the braking force generating means includes an automatic transmission and an exhaust brake system.

3. The vehicle deceleration controller according to claim 1, wherein the required deceleration is stored in the required deceleration memory means as a predetermined map which identifies the required deceleration as a function of the vehicle speed and the gradient of the driving road surface.

4. The vehicle deceleration controller according to claim 1, wherein the operation mode is stored in the operation mode memory means as a predetermined map which identifies the operation mode as a function of the required deceleration, the vehicle speed, and the total vehicle weight.

5. A vehicle deceleration controller used in a vehicle having an accelerator comprising:

determining means for determining release of the accelerator;

a vehicle weight detector which detects a total weight of the vehicle including a load in the vehicle;

braking force generator means for generating a braking force for braking the vehicle;

required deceleration determining means for determining a required deceleration based on a predetermined map when the determining means determines that the accelerator has been released;

required operation mode determining means for determining a required operation mode for the braking force generator means based on at least the required deceleration determined by the required deceleration determining means and the total vehicle weight detected by the vehicle weight detector; and means for operating the braking force generating means under the required operation mode when the determining means determines that the accelerator has been released.

6. The vehicle deceleration controller according to claim 5, wherein the braking force generating means includes an automatic transmission and an exhaust brake system.

7. The vehicle deceleration controller according to claim 5, including a memory storing the predetermined map.

8. The vehicle deceleration controller according to claim 7, wherein the predetermined map identifies the required deceleration based on a speed of the vehicle and a gradient of the driving road surface.

9. The vehicle deceleration controller according to claim 5, including a vehicle speed detector which detects a speed of the vehicle and a road surface gradient detector which detects a gradient of a driving road surface, the required deceleration determining means also determining the required deceleration based on the speed of the vehicle detected by the vehicle speed detector and the gradient of the driving road surface detected by the road surface gradient detector.

10. The vehicle deceleration controller according to claim 5, including a memory storing a predetermined map identifying different required operation modes based on different combinations of required deceleration and total vehicle weight.

11. A method of controlling vehicle deceleration in a vehicle having an accelerator comprising:

determining a weight of the vehicle;

determining that the accelerator has been released;

determining a required deceleration using a predetermined map when it is determined that the accelerator has been released;

determining a required operation mode for generating a braking force to brake the vehicle based on at least the required deceleration determined through use of the predetermined map and the total weight of the vehicle; and implementing the determined required operation mode to generate a braking force to brake the vehicle.

12. The method according to claim 11, including determining a speed of the vehicle, the required deceleration being determined based on at least the determined speed of the vehicle.

13. The method according to claim 12, including determining a gradient of a driving road surface, the required deceleration also being determined based on the determined gradient of the driving road surface.

14. The method according to claim 11, including determining a gradient of a driving road surface, the required deceleration being determined based on at least the determined gradient of the driving road surface.

* * * * *